United States Patent
Kotzin et al.

(10) Patent No.: US 6,173,005 B1
(45) Date of Patent: *Jan. 9, 2001

(54) APPARATUS AND METHOD FOR TRANSMITTING SIGNALS IN A COMMUNICATION SYSTEM

(75) Inventors: Michael D. Kotzin, Buffalo Grove, IL (US); Kamyar Rohani, Grapevine; Walter J. Rozanski, Jr., Hurst, both of TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/923,190

(22) Filed: Sep. 4, 1997

(51) Int. Cl.[7] .................................................. H04B 1/707
(52) U.S. Cl. .......................... 375/141; 375/146; 375/147; 375/148
(58) Field of Search .................................. 375/200, 260, 375/206, 267, 299, 347, 130, 141, 146, 147; 370/334, 320, 335, 342, 465, 468; 455/59, 101, 102, 103, 272, 561, 562

(56) References Cited

U.S. PATENT DOCUMENTS

| 5,442,625 | * | 8/1995 | Gitlin et al. | 370/342 |
| 5,479,448 | * | 12/1995 | Seshadri | 375/267 |
| 5,652,764 | * | 7/1997 | Kanzaki et al. | 455/101 |
| 5,719,857 | * | 2/1998 | Heikkinen | 375/267 |
| 5,742,640 | * | 4/1998 | Haoui et al. | 455/561 |
| 5,809,019 | * | 9/1998 | Ichihara et al. | 375/267 |
| 5,859,875 | * | 1/1999 | Kato et al. | 375/267 |
| 5,864,548 | * | 1/1999 | Liu | 370/320 |
| 5,963,508 | * | 10/1999 | Virtanen | 370/335 |
| 6,005,855 | * | 12/1999 | Zehavi et al. | 370/335 |
| 6,072,787 | * | 6/2000 | Hamalainen et al. | 370/335 |

FOREIGN PATENT DOCUMENTS

0881781A2   12/1998  (EP) .
95/26040  *  9/1995  (WO) .

* cited by examiner

Primary Examiner—Don Vo
(74) Attorney, Agent, or Firm—L. Bruce Terry; Richard Sonnentag

(57) ABSTRACT

Orthogonal transmit diversity is implemented by employing a data splitter (803) to subdivide channel information (801) into at least a first portion of bits (802) and a second portion of bits (804). Each portion is spread with its own Walsh code for eventual transmission to a mobile station via a predetermined carrier frequency. When the number of bits in the first and second portion (802, 804) are small, separate Walsh codes are used to maintain orthogonality. When the number of bits in the first and second portion (802, 804) are relatively large, a time-division multiplex transmission is used to maintain orthogonality. A controller (809) controls the subdivision of the channel information and also an interleaver (308) to further enhance the effects of the diversity transmission. Control information related to the subdivision is transmitted to the mobile station so the channel information can be accurately reconstructed prior to decoding.

11 Claims, 6 Drawing Sheets

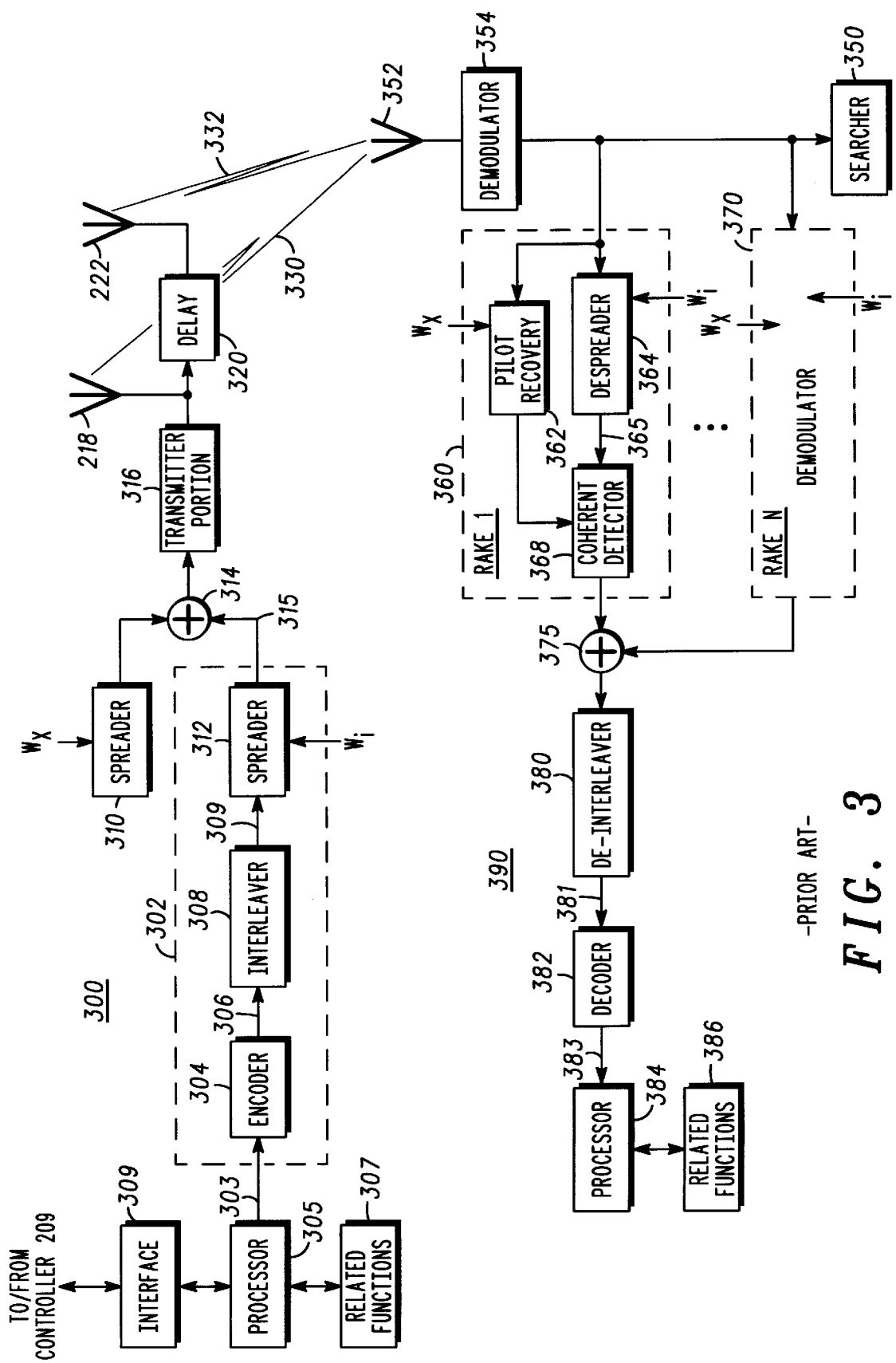
FIG. 3 —PRIOR ART—

APPARATUS AND METHOD FOR TRANSMITTING SIGNALS IN A COMMUNICATION SYSTEM

FIELD OF THE INVENTION

The present invention relates, in general, to communication systems and, more particularly, to transmitting signals in such communication systems.

BACKGROUND OF THE INVENTION

Forward link (base-station to mobile station) transmit diversity has been proposed for improving the performance of code-division multiple access (CDMA) communication systems. To implement forward link transmit diversity, a delayed (but otherwise identical) copy of the original signal is transmitted from an additional antenna. In the mobile station, a RAKE receiver, well known to those skilled in the art, is capable of resolving these delayed signals and combining them to enhance signal reception, especially when experiencing typical mobile propagation characteristics such as Rayleigh fading is present. A system which implements forward link transmit diversity is able to provide improved sensitivity and robustness to interference and multipath in the CDMA environment.

In current mobile stations, however, the RAKE receiver is only capable of resolving and combining a total of three (3) simultaneous rays. These rays may be produced not only from the forward link transmit diversity technique described, but also created by, inter alia, (a) signals received from other cells intended for the particular subscriber (soft handoff), (b) signals received from other sectors (within a cell) intended for that subscriber (softer handoff), or (c) multiple reflections due to the environment (multipath) of any or all of the above signals. As such, it is clear that under certain situations, the limitations of the RAKE receiver within the mobile station would prevent beneficial utilization of the additional ray produced from the application of forward link transmit diversity. In fact, when such a situation occurs, a degradation in CDMA reception actually occurs, negatively impacting system performance.

One other problem associated with forward link transmit diversity as implemented in a CDMA communication system is that the delayed (but otherwise identical) copy of the original signal transmitted from an additional antenna acts as interference to the original signal. Stated in CDMA terms, the delayed (but otherwise identical) copy of the original signal transmitted from an additional antenna is not orthogonal to the original signal and acts as self-interference. Since CDMA communication systems are interference limited, adding interference to a particular coverage area without maintaining orthogonality likewise causes a degradation in CDMA system performance.

One solution proposed for the implementation of forward link transmit diversity in a CDMA communication system is that described in U.S. application Ser. No. 08/904,204, titled "METHOD AND APPARATUS FOR TRANSMITTING SIGNALS IN A COMMUNICATION SYSTEM" by Kotzin et al., assigned to the assignee of the present invention. By implementing the methods described therein, improvements in forward link transmit diversity in a CDMA communication system are realized. The capability of implementing improved forward link transmit diversity in this manner also leads to other beneficial implementations which result in improved CDMA system performance and quality.

BRIEF DESCRIPTION OF THE DRAWINGS

FIG. 3 generally depicts a transmitter of a base-station in CDMA communication with a mobile station using the orthogonal code assignment of the prior art.

DETAILED DESCRIPTION OF THE PREFERRED EMBODIMENT

Figure 1:
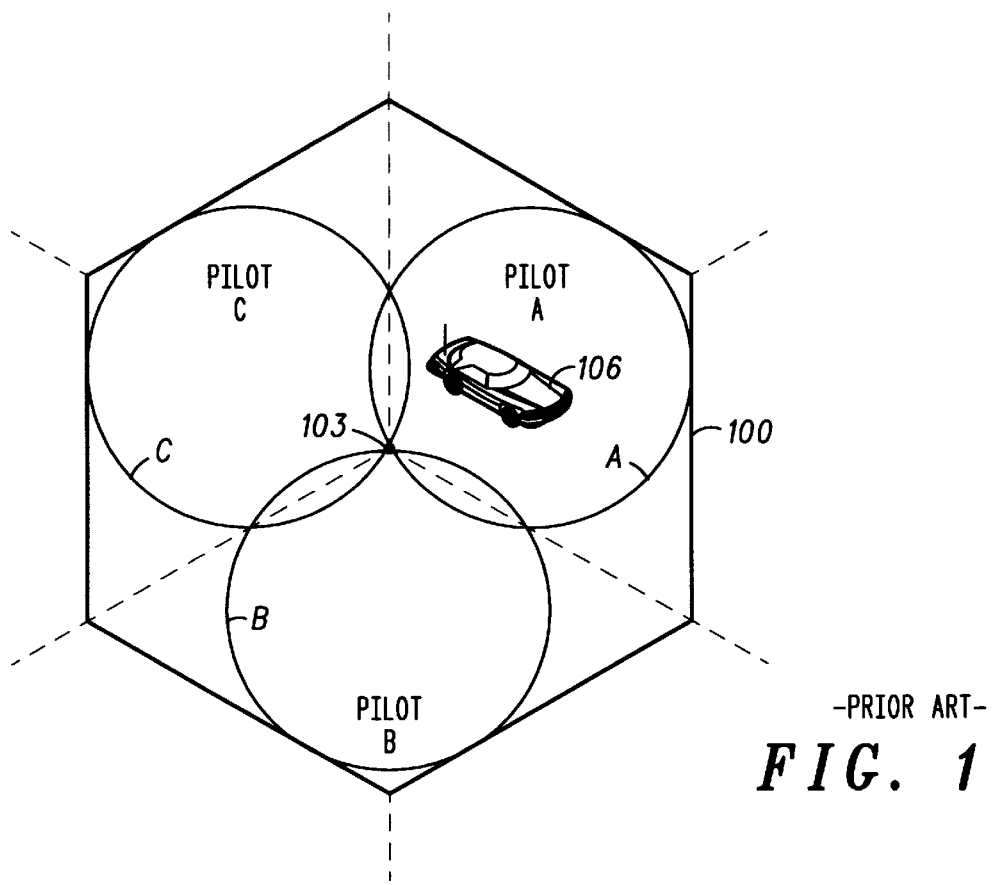
FIG. 1 generally depicts a 120° sectored cellular coverage area having dedicated pilot channels transmitted throughout the sector as in the prior art.

Generally stated, orthogonal transmit diversity is implemented by employing a data splitter to subdivide channel information into at least a first portion of bits and a second portion of bits. Each portion is spread with its own Walsh code for eventual transmission to a mobile station via a predetermined carrier frequency. When the number of bits in the first and second portion are small, separate Walsh codes are used to maintain orthogonality. When the number of bits in the first and second portion are relatively large, a time-division multiplex transmission is used to maintain orthogonality. A controller controls the subdivision of the channel information and also an interleaver to further enhance the effects of the diversity transmission. Control information related to the subdivision is transmitted to the mobile station so the channel information can be accurately reconstructed prior to decoding.

Stated more specifically, a base-station in a communication system comprises a plurality of antennas for transmitting a signal including channel information and means for subdividing the channel information into at least a first portion and a second portion. The base-station also includes a means for transmitting the first portion of the channel information to a mobile station via a first antenna from the plurality of antennas and the second portion of the channel information to the mobile station via a second antenna from the plurality of antennas and control information related to the subdivision of the channel information.

The means for subdividing subdivides the channel information into a first portion having at least one bit and a second portion having at least one bit. The first and second portions are transmitted to the mobile station alternately in time or at substantially the same time. The means for subdividing the channel information also subdivides the channel information into equal or unequal first and second portions. When subdividing into unequal first and second portions, the channel information can be subdivided into a first portion having all of the channel information and a second portion having none of channel information. The Walsh code assignment varies with the subdivision of the channel information, while the power level of transmissions from the first antenna and the second antenna are variable based on system characteristics. The power level of the transmissions from the first antenna and a power level of the transmissions from the second antenna are variable to either be of equal or unequal power based on the system characteristics.

The means for transmitting also transmits pilot signals via the first antenna and the second antenna, where each of the pilot signals are spread by different Walsh codes. The control information related to the subdivision of the channel information is transmitted to the mobile station by either a dim and burst technique or a control channel, specifically a slow associated control channel (SACCH). The control information includes a number of bits, a ratio of bits sent to the first and second antennas within the first and second portions or a Walsh code assignment per antenna. The channel information is comprised of traffic channel information and the control information.

Stated more generally, a base-station in a communication system comprises a plurality of antennas for transmitting a signal including channel information and means for subdividing the channel information into at least a first portion and a second portion such that the first portion of the channel information is transmitted to a mobile station via a first antenna from the plurality of antennas and the second portion of the channel information is transmitted to the mobile station via a second antenna from the plurality of antennas. The base-station also includes a means for controlling the subdivision of the channel information based on system characteristics. The system characteristics include the amount of fading experienced by the mobile station per antenna and the reception quality of either the first or second portion received by the mobile station.

A receiver in a mobile station includes a means for receiving first and second signals transmitted by a transmitter from corresponding first and second antennas and control information related to a subdivision of channel information at the transmitter, where the first signal includes a first portion of the channel information and the second signal includes a second portion of the channel information a means for recombining the first portion of channel information and the second portion of channel information based on the control information related to the subdivision of channel information. The control information includes a number of bits, a ratio of bits sent to the first and second antennas within the first and second portions or a Walsh code assignment per antenna.

A communication system incorporating the inventive techniques disclosed herein includes, at a base-station, a plurality of antennas for transmitting a signal including channel information and a means for subdividing the channel information into at least a first portion and a second portion. The base-station further includes a means for transmitting the first portion of the channel information to a mobile station via a first antenna from the plurality of antennas and the second portion of the channel information to the mobile station via a second antenna from the plurality of antennas and control information related to the subdivision of the channel information. At a mobile station, a means for receiving receives the first and second portions transmitted from the first and second antennas and the control information related to the subdivision of the channel information at the transmitter and a means for recombining recombines the first portion of channel information and the second portion of channel information into substantially the channel information based on the control information related to the subdivision of channel information.

Stated again generally, a base-station in a communication system includes a plurality of antennas for transmitting a signal including channel information and a means for subdividing the channel information into at least a first portion and a second portion. The base-station further includes a means for transmitting the first portion of the channel information to a mobile station via a first antenna from the plurality of antennas on a predetermined carrier frequency and the second portion of the channel information to the mobile station via a second antenna from the plurality of antennas on the predetermined carrier frequency.

FIG. 1 generally depicts a 120° sectored cellular coverage area (cell) having dedicated pilot channels $Pilot_{A-C}$ transmitted throughout their respective sectors as is well known in the prior art. For the sake of convenience, only a single cell 100 is shown in FIG. 1, but one of ordinary skill in the art will appreciate that a typical cellular communications system has many such cells positioned next to one another. As shown in FIG. 1, a base-station 103 having three CDMA transceivers, is centered within the cell 100 at least one of which is capable of communicating to a mobile station 106 via a wireless air interface. In the preferred embodiment, the wireless air interface is compatible with the code-division multiple access (CDMA) cellular communication system defined in IS-95A. For more information on IS-95A, see TIA/EIA/IS-95-A, *Mobile Station-Base Station Compatibility Standard for Dual Mode Wideband Spread Spectrum Cellular System,* March 1995, published by the Electronic Industries Association (EIA), 2001 Eye Street, N.W., Washington, D.C. 20006.

Figure 2:
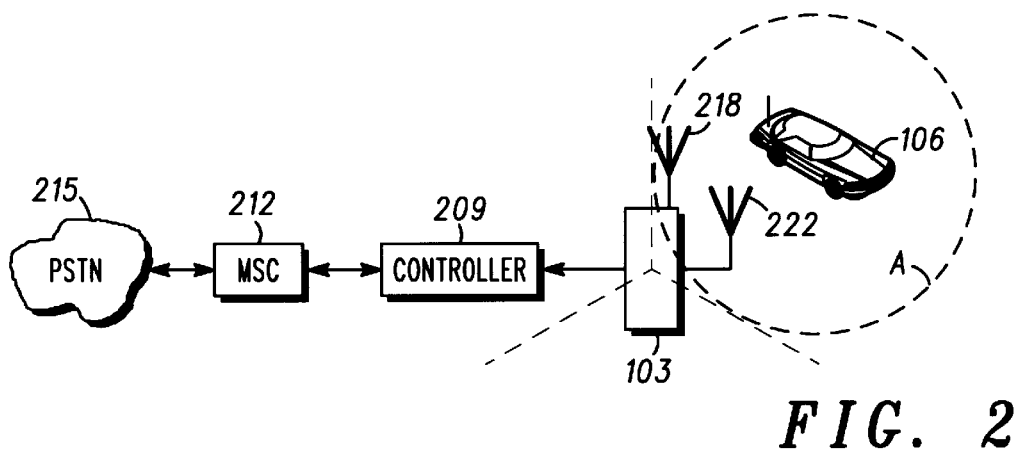
FIG. 2 generally depicts a block diagram of the 120° sectored cellular coverage area of FIG. 1 supported by a base-station having two antennas to support forward link transmit diversity.

FIG. 2 generally depicts a block diagram of the 120° sectored cellular coverage area of FIG. 1 supported by base-station 103 having two antennas 218, 222 to support forward link transmit diversity. Again, for the sake of simplicity, only the sector A from FIG. 1 is shown in FIG. 2. As stated earlier, base-station 103 shown in FIG. 2 is capable of communicating via CDMA communication channels to a mobile station 106. Coupled to base-station 103 is a controller 209 which performs, inter alia, transcoding and switching functions primarily related to the communication system. Controller 209 is coupled to a mobile switching center (MSC) 212 which primarily performs switching functions related to the land line network. Coupled to MSC 212 is the public switched telephone network (PSTN) 215 which includes, inter alia, originating subscribers, fax machines, etc. which are capable of originating and/or receiving communications to/from mobile station 106 within the CDMA communication system.

Figure 5:
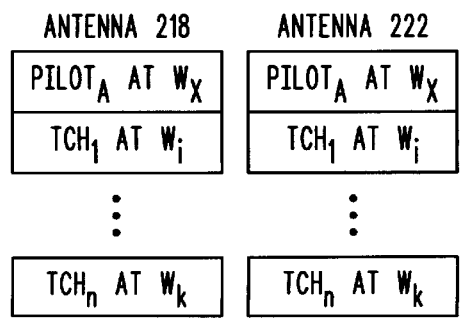
FIG. 5 generally depicts the assignment of orthogonal codes to implement forward link transmit diversity in the prior art.

Also shown in FIG. 2 are a pair of antennas 218 and 222 which are capable of implementing forward link transmit diversity within the coverage area of sector A. With reference to FIG. 2 and FIG. 5, the problems associated with the prior art implementation of forward link transmit diversity can now be explained. A group of orthogonal codes are assigned to be transmitted via antennas 218 and 222. In the preferred embodiment, the orthogonal codes are Walsh codes. As seen in FIG. 5, a pilot channel $Pilot_A$ is transmitted via antenna 218 and 222 using Walsh code $W_x$. For measurement and acquisition reasons, this pilot is set to have a large amplitude compared to any other individual signals transmitted—perhaps 20% of the maximum total transmitted power. As can also be seen in FIG. 5, all traffic channel information for N separate users ($TCH_N$) is transmitted to mobile station 106 via antennas 218 and 222 with Walsh codes which are different from the Walsh code used for the pilot channel Pilot$_A$, but are the same for the transmissions via antenna 218 and 222. These Walsh codes are shown as Walsh codes W$_i$ through W$_k$. While the signals transmitted between antennas 218 and 222 are delayed in time, and as such a RAKE receiver within the mobile station 106 can resolve and combine these signals into a composite signal, the signals transmitted via antennas 218 and 222 are not orthogonal to one another and thus increase the amount of interference within the coverage area, sector A. As such, and as explained above, some of the potential advantage gained by implementing forward link transmit diversity is mitigated due to the increased interference presented by the copy of the original signal.

FIG. 3 generally depicts a transmitter 300 of a basestation in CDMA communication with a mobile station using the orthogonal code assignment of the prior art. As shown in FIG. 3, information in the form of traffic channel bits 303 input to a encoder 304 via a processor 305 at a particular bit rate (e.g. 9.6 kilobits/second). The processor 305 primarily receives the traffic channel bits 303 from the interface 309 which is coupled to a controller (not shown in FIG. 3). The processor 305 is also coupled to a block designated related functions 307, where functions including call processing, link establishment, and other general functions related to establishing and maintaining cellular communications are performed. In the preferred embodiment, the traffic channel bits 303 include either voice information, data information, or a combination of the two. Encoder 304 encodes the traffic channel bits 303 into data symbols 306 at a fixed encoding rate (1/r) with an encoding algorithm which facilitates subsequent maximum likelihood decoding of the data symbols into data bits (e.g. convolutional or block coding algorithms). For example, encoder 304 is capable of encoding traffic channel bits 303 (e.g., 192 input data bits) received at a rate of 9.6 kilobits/second at a fixed encoding rate of one data bit to two data symbols (i.e., rate=1/2) such that the encoder 304 outputs data symbols 306 (e.g., 384 data symbols output) at a 19.2 kilosymbols/second rate. The encoder 304 is capable of encoding at other rates (i.e., rate=full rate, rate=1/8) as one skilled in the art will appreciate.

The data symbols 306 are input into an interleaver 308 which organizes the data symbols 306 into blocks (i.e., frames) and block interleaves the input data symbols 306 at the symbol level. Within the interleaver 308, the data symbols are individually input into a matrix which defines a predetermined size block of data symbols. The data symbols are input into location in the matrix so that the matrix is filled in a column by column sequence and are individually output from locations in the matrix so that the matrix is emptied in a row-by-row sequence. The matrix is a rectangular matrix having an integer number of rows and columns which are chosen to increase the output interleaving distance between the consecutively input non-interleaved data symbols. The result is interleaved data symbols 309 which are output by the interleaver 308 at the same data symbol rate that they were input (e.g., 19.2 kilosymbols/second). The predetermined size of the block of data symbols defined by the matrix is derived from the maximum number of data symbols which can be transmitted at a coded bit rate within a predetermined length transmission block. For example, if data symbols 303 are output from the encoder 304 at a 19.2 kilosymbols/second rate, and if the predetermined length of the transmission block is 20 milliseconds, then the predetermined size of the block of data symbols is 19.2 kilo symbols/second multiplied by 20 milliseconds (ms), resulting in 384 data symbols which defines a 16 by 24 matrix. It will be appreciated by those skilled in the art that the data symbols within the stream of encoded, interleaved data bits 309 may be spread according to numerous other algorithms into a sequence of larger length codes without departing from the scope and spirit of the present invention.

The encoded, interleaved data symbols 309 are next input to a spreader 312 which convolves the interleaved symbols 309 with an orthogonal spreading sequence. The orthogonal spreading sequence is a signal which is the product of two signals; the first signal is a QPSK pseudorandom sequence whose time offset is known and the second signal is an orthogonal spreading code such as a Walsh code W$_i$. For more information on the orthogonal spreading sequence, see §3.1.3.1 of ANSI J-STD-008, *Personal Station Base Station Compatibility Requirement for 1.8 to 2.0 GHz Code Division Multiple Access (CDMA) Personal Communications Systems,* Mar. 24, 1995, published by the Electronic Industries Association (EIA), 2001 Eye Street, N.W., Washington, D.C. 20006. The spreader 312 outputs QPSK chips at a rate which is the product of the input rate from interleaver 308 and the length of the orthogonal spreading sequence (e.g., orthogonal spreading sequence of length 64 would be a 64 bit length Walsh Code). This would result in an output rate of the spreader 312 of 1.2288 megachips/second (i.e., 19.2 kilosymbols/second×64).

As shown in FIG. 3, spreader 312 accomplishes the spreading associated with the traffic channel. In this embodiment, the encoder 304, interleaver 308 and spreader 312 comprise a single traffic channel generator 302. For systems requiring multiple traffic channels, traffic channel generator 302 would be duplicated for each traffic channel and its output would be summed by the summer 314 along with the QPSK chips from the spreader 310. Spreader 310 accomplishes the spreading for the pilot channel. As the pilot channel transfers no information bits, no data input from the processor 305 is required. In the preferred embodiment, the information which is spread to form the pilot channel consists of a stream of data comprised of all 0's.

The summed QPSK chips are output from the summer 314 at a rate of 1.2288 megachips/second, and are input into the transmitter portion 316 of the transmitter 300. The transmitter portion 316 prepares the summed QPSK chips for transmission over a communication channel by upconverting them to the appropriate transmit frequency. Following upconversion, the signal is bandpass filtered to remove unwanted sideband energy and then is output from the transmitter portion 316. The modulated signal from the transmitter portion 316 is provided to an antenna 318 for transmission over the radio communications path 330. The signal from transmitter portion 316 is also directed to a delay circuit 320 which delays the modulated signal, where it is then provided to antenna 322 for transmission over the radio communication path 332. By providing the receiver 390 with two signals 330 and 332, each of which are delayed from one another by a predetermined amount, diversity at the receiver 390 is accomplished.

Still referring to FIG. 3, a receiver 390 receives the sum of both transmitted spread-spectrum signals from the radio communication paths 330 and 332 through antenna 352 and is passed to the demodulator 354. The demodulator 354 filters the input signal to remove unwanted adjacent frequency signals after down-conversion from the transmit frequency and sampling at a predetermined rate (e.g., 1.2288 megasamples/second). The QPSK sampled signal from demodulator 354 is despread by the despreader 364 by correlating the received sampled signals with the despreading code, where the despreading code is a copy of the original spreading sequence. Recall that the original orthogonal spreading sequence is the product of two signals; the first signal is a QPSK pseudorandom sequence whose time offset is known and the second signal is an orthogonal spreading code such as Walsh code $W_i$. The resulting despread sampled signal 365 is sampled at a predetermined rate, for example, 19.2 kilosamples/second, so that a sequence of 64 samples of the received spread-spectrum signal is despread. This signal is represented by a single complex (amplitude and phase) data sample and output to a coherent detector 368 for coherent detection.

As can be seen in FIG. 3, the output of demodulator 354 is also fed to the pilot recovery circuit 362 wherein a process similar to that performed by the despreader 364 is completed, except that the Walsh code $W_x$ is used for recovery rather than Walsh code $W_i$. Output from both the pilot recovery circuit 362 and the despreader 364 are input to the coherent detector 368 which takes the complex conjugate of the output of the pilot recovery circuit 362 and multiplies this by the output of the despreader 364. The real part of the solution is passed as an output of coherent detector 368 (the imaginary part of the complex multiply is discarded).

The output of the demodulator 354 is also provided to a searcher 350 which searches for all signals spread with Walsh code $W_x$ which are generated by base-station transmitter 300. In this instance the searcher 350 would find two signals, one from radio communication path 330 and the other from radio communications path 332. With this information, the searcher 350 assigns a first finger RAKE receiver 360 and a second finger RAKE receiver 370 to each of these paths. Both rake finger receivers 360 and 370 are identical in operation. The output of the RAKE receivers 360 and 370 are summed by summer 375 and the output of the summer 375 is provided to de-interleaver 380, which essentially "undoes" the interleaving process performed by the interleaver 308. In the de-interleaver 380, the data symbols are individually input into a matrix which is the same size as the matrix in the interleaver 308. The data symbols are input into a location in the matrix such that the matrix is filled in a row by row sequence and the data symbols are individually output from locations in the matrix such that the matrix is emptied in a column by column sequence.

The de-interleaved soft decision data 381 output from the de-interleaver 380 are input to a decoder 382 which uses well known maximum likelihood sequence estimation (MLSE) decoding techniques to generate estimated traffic channel data bits 383 The MLSE decoding techniques may be augmented by using an algorithm which is substantially similar to a Viterbi decoding algorithm. The decoder 382 uses a group of the individual soft decision data 381 to form a set of soft decision transition metrics for use at each particular time state of the MLSE decoder 382. The number of soft decision data 364 in the group used to form each set of soft decision transition metrics corresponds to the number of data symbols 306 at the output of the convolutional encoder 304 generated from each input data bit 303. The number of soft decision transition metrics in each set is equal to two raised to the power of the number of soft decision data 364 in each group. For example, when a 1/2 convolutional encoder is used in the transmitter 300, two data symbols 306 are generated from each input data bit 303. Thus, decoder 366 uses groups of two individual soft decision data 381 to form four soft decision transition metrics for use at each time state in the MLSE decoder 382 The estimated traffic channel data bits 383 are generated at a rate related to the rate at which the soft decision data 381 are input to the decoder 382 and also the fixed rate used to originally encode the traffic channel bits 303. As an example, if the soft decision data 381 are input at 19.2 kilosymbols/second rate and the original encoding rate was 1/2, then the estimated traffic channel bits 383 are output at a rate of 9600 bits/second. The estimated traffic channel bits 383 are input into a processor 384 which, together with a related functions block 386, present the estimated traffic channel bits 383 in a form suitable for use by the user of the mobile station.

Figure 4:
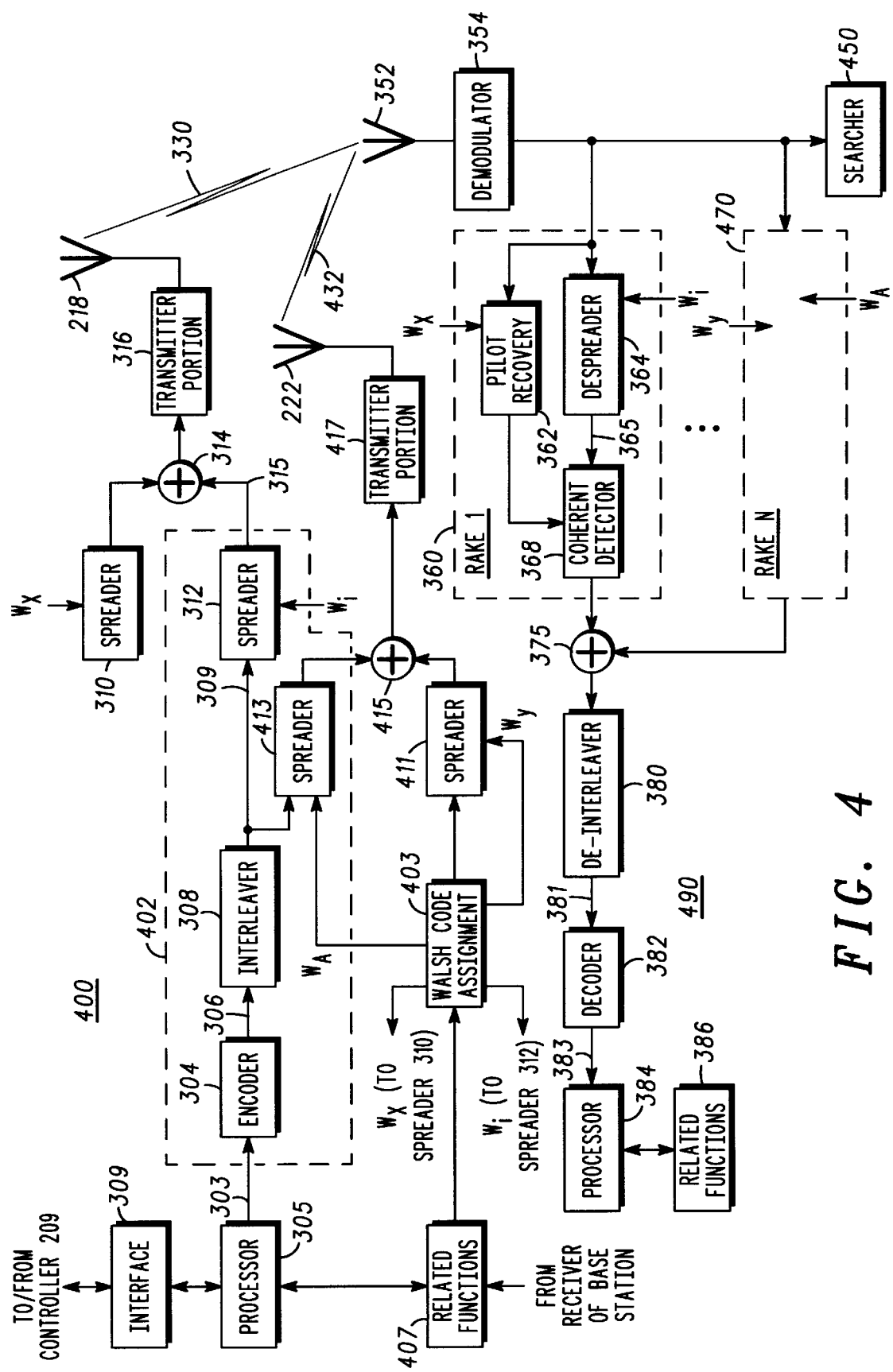
FIG. 4 generally depicts a transmitter of a base-station in CDMA communication with a mobile station using the orthogonal code assignment in accordance with the present invention.

FIG. 4 generally depicts a transmitter of a base-station in CDMA communication with a mobile station using the improved orthogonal code assignment technique to improve forward link transmit diversity. Those blocks between FIG. 3 and FIG. 4 which have common functionality also have common numbering.

As shown in FIG. 4, the blocks up to the interleaver 308 are similar in function to the prior art transmitter 300 of FIG. 3, unless stated otherwise below. Unlike the transmitter 300 shown in FIG. 3, however, the interleaved data symbols 309 output from the interleaver 308 in FIG. 4 are input into two spreaders, spreader 312 and spreader 413. Each of these spreaders 312 and 413 convolves the interleaved symbols 309 with their orthogonal spreading sequence, namely Walsh code $W_i$ and Walsh code $W_A$ respectively. The spreading with the orthogonal spreading sequences (Walsh codes) is functionally equivalent as described above with reference to FIG. 3. Note that the encoder 304, interleaver 308 and two spreaders 312 and 413 comprise a duplicate traffic channel generator 402.

The division and assignment of Walsh codes is performed by Walsh code assignment block 403. Walsh code assignment block 403 divides a predetermined set of orthogonal codes into a plurality of subsets of orthogonal codes and assigns the subsets of orthogonal codes according to predetermined criterion. In the preferred embodiment, the predetermined criterion includes assigning the subsets of orthogonal codes to certain antennas servicing a common coverage area certain or to certain antennas within an antenna array.

Each of the spreaders 312 and 413 outputs QPSK chips at a rate of 1.2288 megachips/second (i.e., 19.2 kilosymbols/second×64). For spreading of the pilot channel, combining the spread pilot and traffic channels and transmitting the combined pilot and traffic channels, the spreader 310, summing node 314 and transmitter portion 314 of FIG. 4 operate functionally equivalent to the corresponding blocks of FIG. 3. The spreader 411, summing node 415 and transmitter portion 417 also operate functionally equivalent to their corresponding blocks of FIG. 3. Important to note is that, unlike the prior art transmitter 300 shown in FIG. 3, each of the spreaders 310 and 411 used for spreading the pilot channel (again, all 0's) use a spreading sequence (Walsh code $W_x$ and Walsh code $W_y$, respectively) which is orthogonal to one another. This means that the transmitted spread-spectrum signals from the radio communication paths 330 and 432 are orthogonal to one another, and thus do not increase the amount of system interference to implement forward transmit diversity as in the prior art.

Still referring to FIG. 4, a receiver 490 receives the sum of both transmitted spread-spectrum signals 330 and 432 from the radio communication paths 330 and 432 via antenna 352 and is passed to demodulator 354 which functions as described above with reference to FIG. 3. The QPSK sampled signal output from demodulator 354 is despread and detected by first finger RAKE receiver 360 as described above for FIG. 3. Additionally, the QPSK sampled signal output from demodulator 354 is despread and detected by a second finger RAKE receiver 470 as essentially described above for FIG. 3, except that the QPSK sampled signal output from demodulator 354 entering this RAKE receiver 470 is despread by Walsh code $W_A$ (for the traffic channel) and Walsh code $W_y$ (for the pilot channel). Note that this differs from the prior art receiver 390 shown in FIG. 3 in that each of the RAKE receivers 360–370 have the pilot channel despread by the same Walsh code $W_x$ and the traffic channel despread by the same Walsh code $W_i$.

The assignment of a particular finger RAKE receiver to a particular communication path is performed by the searcher 450. The searcher 450 searches for all signals spread with Walsh code $W_x$ transmitted by transmitter 400; in this instance, the searcher 450 would find one signal which corresponds to radio communication path 330. With this information, the searcher 450 assigns first finger RAKE receiver 360 to communication path 330 with pilot channel Walsh code $W_x$ and traffic channel Walsh code $W_i$. A similar process is performed by the searcher 450 for signals spread with Walsh code $W_y$ transmitted by transmitter 400. In this instance, second finger RAKE receiver 470 is assigned to communication path 432 with pilot channel Walsh code $W_y$ and traffic channel Walsh code $W_A$.

Having two pilot channels spread by different, orthogonal spreading sequences within a common coverage area (for example, sector A of FIG. 2) allows one of the pilot channels to be used as the primary pilot channel for all mobile stations within the coverage area (as in the prior art) while the other pilot channel is used as a secondary pilot channel. In this implementation, the primary pilot channel, which is used for acquisition and neighbor measurements by mobile station 106, is at a fixed, relatively high signal power level while the secondary pilot channel is at a much lower signal power level. This further acts to reduce unnecessary system interference when implementing forward link diversity.

In the above described implementation where the pilot channels have different signal power levels, a correction prior to summing in summer 375 is required such that the signals entering the summer 375 from each of the RAKE receivers 360 and 470 are at substantially the same power level. One way to accomplish this is by appropriately reducing, via an attenuator, the signals exiting Rake receiver 360 or Rake receiver 470 in accordance with the power level difference at the transmitter 400. All processing after the summer 375 is the same as described above with reference to FIG. 3.

Figure 6:
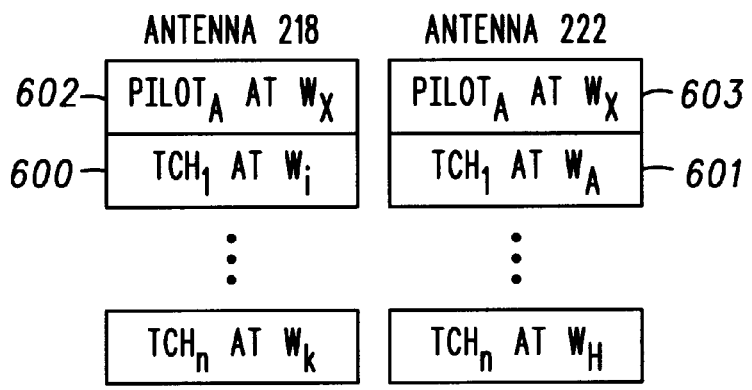
FIG. 6 generally depicts the assignment of orthogonal codes to implement forward link transmit diversity in accordance with the invention.

FIG. 6 generally depicts an exemplary assignment of orthogonal codes to implement forward link transmit. As shown in FIG. 6, each antenna 218 and 222 have a separate group of dedicated Walsh codes assigned thereto. For example, with reference to FIG. 6, a primary pilot channel transmitted via antenna 218 is spread by Walsh code $W_x$ while a secondary pilot channel transmitted via antenna 222 is spread by a different Walsh code $W_y$. Likewise, all traffic channels for each of N separate users ($TCH_N$) may each have separate Walsh codes assigned thereto on the secondary antenna 222. It is important to note, however, is that the TCH information (for example $TCH_1$ as shown in blocks 600–601) is the same information. Also important to note is that the pilot channels $Pilot_A$ shown in blocks 602–603 are likewise common pilot channels which are spread using different Walsh codes. This allows combining of the information transmitted from both base antennas within the mobile station receiver after each has been respectively demodulated with the aid of its associated pilot. It will be appreciated by one skilled in the art that the benefits provided by this technique of implementing forward link transmit diversity are also realized by an alternate embodiment where the common TCH information as shown in blocks 600–601 is spread by a common Walsh code. In this case, for example, $W_i = W_A$.

It should be understood that the design of and knowledge contained within mobile station 106 is such that it properly performs a demodulation technique appropriate to whether a diversity signal is being transmitted or not. This includes full knowledge of what codes are used for all the pilots and traffic channels on each of the antennas. This may be facilitated through the use of messaging of information between the base-station 103 and mobile station 106. Methods to implement signaling of this information are known and are readily accomplished with messages provided in the IS-95 standard.

Referring to the preferred embodiment described above, by assigning the portions of information to be transmitted (either the pilot channel or the TCH) different orthogonal or Walsh codes, orthogonality within the particular coverage area (for example, sector A) can thus be maintained. By maintaining orthogonality while implementing forward link transmit diversity, all of the advantages of forward link transmit diversity are realized without degrading CDMA system performance.

Figure 7:
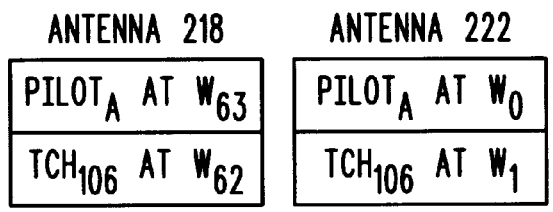
FIG. 7 generally depicts an example of an assignment of IS-95A Walsh orthogonal codes to implement forward link transmit diversity in accordance with the invention.

In its simplest form, implementation of forward link transmit diversity is the use of a different orthogonal spreading sequence to spread common pilot channels and TCHs for transmission on a second antenna. In an IS-95A scenario where 64 orthogonal (Walsh) codes are implemented, this can be accomplished by using two Walsh codes on antenna 218 which are not used on antenna 222. Such an assignment of Walsh codes for the IS-95A example is shown in FIG. 7. As shown in FIG. 7, antenna 218 is assigned Walsh code 63 to spread the pilot channel $Pilot_A$ and thus act as a pilot channel for all mobile stations that are in the transmit diversity mode, while Walsh code 62 is used to spread the TCH information intended for mobile station 106 (designated $TCH_{106}$ in FIG. 7). Antenna 222 is then assigned Walsh code 0 to spread the pilot channel $Pilot_A$ and Walsh code 1 to spread the $TCH_{106}$ information intended for mobile station 106. Walsh code 0, in this example, thus acts as the common pilot channel for all mobile stations being served by or performing mobile assisted handoff (MAHO) on that coverage area, while Walsh code 1 conveys the TCH information to the particular mobile station.

The ability to assign Walsh codes to a particular antenna leads to many beneficial features within the cellular communication system. For example, one of ordinary skill in the art will appreciate that while the concept has been explained with reference to antenna 218 and antenna 222 as shown in FIG. 2, any number of antennas can be assigned their own Walsh codes, e.g. as in an antenna array. For example, in the IS-95A situation described above, eight antennas within an antenna array can be assigned eight Walsh codes which are themselves not assigned to any other antenna, and these eight Walsh codes can then be used to spread a pilot channel for each respective antenna, for example $Pilot_A$. Mobile station 106 could then be assigned a single Walsh code for its traffic channel information $TCH_{106}$ that would then be transmitted on all of the antenna elements within the array. By setting the relative phases and amplitudes of this single Walsh code used to spread the $TCH_{106}$ information on the individual antenna elements, beamforming to direct transmit power directly at mobile station 106 is achieved.

To generate a reference signal within mobile station 106 to perform coherent demodulation, base-station 103 informs mobile station 106 of the relative amplitudes and phases of the $TCH_{106}$ Walsh code that base-station 103 used to form the beam toward mobile station 106. This is accomplished by transmitting an appropriate message from base-station 103 to mobile station 106 including such information. Mobile station 106 would then determine the amplitude and phase of each of the pilot channels $Pilot_A$ spread with different Walsh codes on the individual antennas. Given the relative amplitudes and phases of the pilot channels $Pilot_A$ spread with different Walsh codes and the message from base-station 103 which includes the relative amplitudes and phases of the $TCH_{106}$ Walsh code, mobile station 106 calculates a difference vector for each different pilot channel Walsh code. The sum of all of these difference vectors is then used by the mobile station 106 to perform coherent demodulation.

Adequate signal to interference ratio necessary to improve reuse may be obtained when the same traffic channel Walsh code is used for multiple mobiles in the same sector by forming separate beams on each of the mobiles and transmitting them over the same antenna array. In each of these cases, the pilot channel/Walsh code for each antenna could be shared among all mobile stations within the coverage area of interest (for example, sector A of FIG. 2).

Another benefit resulting from the ability to assign separate pilot Walsh codes to a particular antenna is the ability to control the use of forward link transmit diversity. By using the prior art assignment scheme as shown in FIG. 5, the only "control" available is to either transmit nothing to the mobile station 106 or transmit via both antenna 218 and antenna 222. This is due to the fact that some RAKE combining algorithms weight the combining strictly on the amount of pilot signal level received. Therefore, if multiple antennas are used having the pilot signal but no proper traffic channel is present, undesirable noise may be combined causing system degradation. However, there are certain modes and/or certain characteristics which occur during a communication where the transmission of both the original signal and its delayed version via antennas 218 and 222 is not beneficial. For example, when mobile station 106 enters a soft handoff condition, and specifically a three-way soft handoff condition, the presence of the delayed version of the signal via antenna 222 does not help the mobile station 106 to better decode the signal (remember that mobile station 106 is only capable of resolving a total of three (3) simultaneous rays). Additionally, any more than three (3) rays transmitted to only a single mobile station 106 means that excess (unused) power is being transmitted by base-station 103, which degrades system performance. When the Walsh code assignment of FIG. 6 is implemented, however, the use of forward link transmit diversity is controllable since the mobile station 106 can now be instructed, via appropriate messaging, as to which pilot channel $Pilot_A$ to listen via the different Walsh code assignment. As such, in the three-way handoff example described above, one of the signals being transmitted via forward link transmit diversity is removed since it does not help the mobile station 106 to better decode the signal.

Other modes and/or characteristics occur during a communication which require a mechanism to inhibit or control the use of forward link transmit diversity at the base-station 103. For example, it might be necessary to inhibit forward link transmit diversity when it is determined that the radio channel (i.e., the radio frequency carrier) is experiencing excessive delay spread. Since the uplink (mobile station to base-station) and the downlink (base-station to mobile station) transmission paths tend to be reciprocal, the amount of delay spread experienced at the mobile station 106 can be inferred from the uplink transmission. If significant energy is received in multiple rays at the base-station, (as determined, for example, by knowing how many fingers are utilized to decode the uplink signal), the addition of another ray in the forward link (via antenna 218 or 222) may only serve to degrade overall system performance. This information is readily available from the receiver (not shown) of the base-station 103 and can be input into the related functions block 407 for use by the Walsh code assignment block 403 of FIG. 4.

Numerous other modes and/or characteristics occur which could serve to provide useful information upon which to help base a control decision for the use of forward link transmit diversity. These modes and/or characteristics include the receive signal strength as determined by the mobile station 106 (or the base-station 103 is the transmission paths are assumed to be reciprocal), the pilot measurement information obtained in a pilot strength measurement message (PSMM), and the delay of a signal received at the mobile station 106. This last characteristic gives a direct indication of the distance of the mobile station 106 from the base-station 103 which could then be used to determine the high likelihood of an excessive amount of delay spread.

Still another mode and/or characteristic to control the use of forward link transmit diversity could be the location of the mobile station 106. For example, a coverage area such as sector A could be pre-tested to determine the locations within the coverage area where forward link transmit diversity is known to provide degraded coverage to the mobile station. This pre-test information representing these locations can then be locally stored at the base-station 103 or at a central facility, such as the controller 209. When the base-station 103 determines the location of the mobile station 106, a comparison can be made to the stored information to determine if the mobile station 106 is in one of the "known-bad" locations. If the mobile station 106 is in a "known-bad" location, then forward link transmit diversity will not help the mobile station 106 and it will thus be disabled until the mobile station 106 moves into a more suitable area within the coverage area; if the mobile station is not in a "known-bad" location, then forward link transmit diversity is enabled.

In an alternate embodiment, the mobile station 106 could be equipped to determine its own location and provide this information to the base-station 103 for the comparison. One such mechanism for the mobile station 106 to determine its own location is via the use of the Global Positioning System (GPS) or the like. If the mobile station 106 is capable of determining its own position, the pre-test information could also be downloaded to the mobile station 106 and stored locally therein. In this configuration, the mobile station 106 itself could determine that it is in a "known-bad" or "known-good" location, and disable/enable reception of one of the pilot channels spread with orthogonal spreading codes accordingly.

Figure 8:
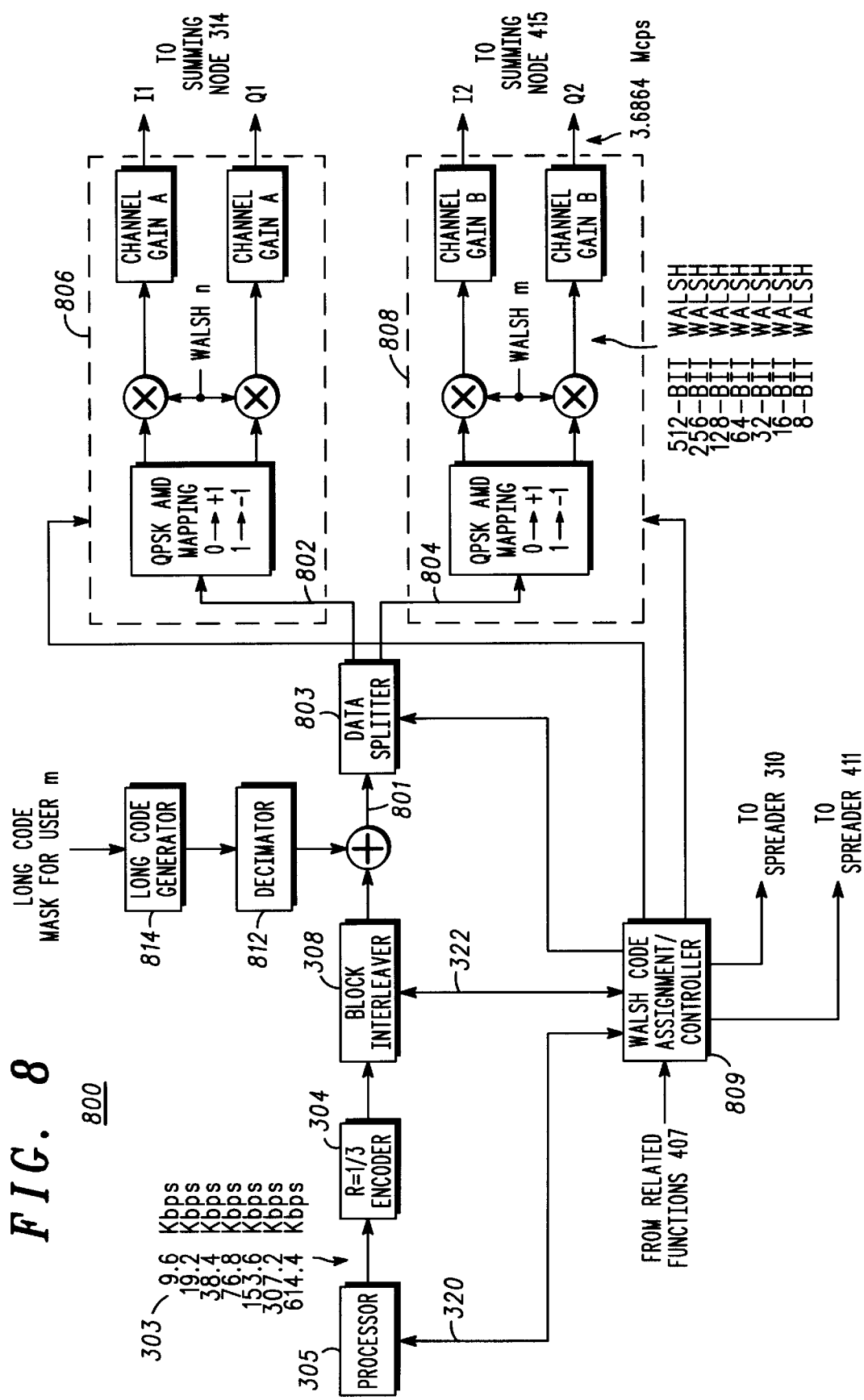
FIG. 8 generally depicts a transmitter beneficially implementing orthogonal transmit diversity in accordance with the invention.

As stated above, the ability to assign Walsh codes to a particular antenna leads to many beneficial features within the cellular communication system. FIG. 8 generally depicts a transmitter 800 beneficially implementing orthogonal transmit diversity in accordance with the invention. As shown in FIG. 8, a data splitter 803 is included to subdivide the channel information 801 (i.e., the encoded information output from the encoder 304) into at least a first portion 802 and a second portion 804. In the preferred embodiment, the channel information 801 is subdivided into at least a first portion 802 of channel information and a second portion 804 of channel information.

The subdivided portions 802 and 804 of channel information 801 are then spread by spreaders 806 and 808, respectively, whose operation is equivalent to spreaders 312 and 413 depicted in FIG. 4. The spread subdivided portions, represented in I/Q form of FIG. 8 as $I_1/Q_1$ (associated with first portion 802) and $I_2/Q_2$ (associated with second portion 804) are presented to summing nodes 314 and 415, respectively. The summing nodes 314 and 415 are those summing nodes shown in FIG. 4 also having as input pilot signals spread by different Walsh codes via spreaders 310 and 411 in accordance with the invention. As such, each spread subdivided portion data stream $I_1/Q_1$ and $I_2/Q_2$ is eventually transmitted to a mobile station via transmitter portions 316 and 417 via different antennas 218 and but on a common, predetermined carrier frequency in accordance with the invention. While FIG. 8 depicts the channel information 801 subdivided into two portions 802 and 804 of channel data for corresponding transmission via two antennas 218 and 222, one skilled in the art will appreciate that the channel information 801 can be subdivided into any number of portions for transmission to the mobile station via any number of antennas.

Important to note is the number of bits within the first and second portions 802 and 804 of the channel information 801 is variable in accordance with the invention. For example, in a first implementation, the data splitter 803 splits the channel information 801 bit-by-bit such that first and second portions 802 and 804 include one bit of the channel information 801 directed to each antenna 218 and 222 for transmission. As such, as far as the transmitting base-station and the receiving mobile station are concerned, the transmission of the first and second portions 802 and 804 occurs at substantially the same time. In this implementation in accordance with the invention, orthogonality is maintained between the transmitted data streams $I_1/Q_1$ and $I_2/Q_2$ by using different Walsh codes per antenna. This is depicted in FIG. 8 as different Walsh codes $W_n$ and $W_m$ within spreaders 806 and 808.

Using this implementation, the orthogonal transmission via multiple antennas does not unnecessarily reduce the number of available Walsh codes. To maintain a constant output rate, a single 256-bit Walsh code would be implemented per antenna without an orthogonal transmission. However, since the data rate per antenna is half in accordance with the invention, two 512-bit Walsh codes are utilized per antenna in the preferred embodiment. As such, the implementation of FIG. 8 does not unnecessarily reduce the number of available Walsh codes to maintain orthogonal transmissions in accordance with the invention. Note that the method and apparatus shown to implement orthogonal transmission via multiple antennas applies equally to transmitter configurations which output channel information at different rates. For example, while FIG. 8 depicts a configuration which outputs channel information at 3.6864 Mega chips per second (Mchip/s), the method and apparatus apply equally to the configuration of FIG. 3 which outputs channel information at 1.2288 Mchip/s.

An additional benefit of the implementation of FIG. 8 is that, since the traffic channel information 801 is subdivided and sent on multiple diversity channels, a diversity gain is achieved in the decoder in the mobile station by processing a group of bits received from the multiple antennas 218 and 222. Also, since each subdivided portion is transmitted via a different antenna 218 and 222, each transmitted data stream $I_1/Q_1$ and $I_2/Q_2$ associated with each portion will undergo a different fading condition. When combined with the interleaving provided by interleaver 308, the implementation of FIG. 8 provides a form of time-space coding which also improves the performance of the decoder in the mobile station. Improvement in decoder performance in the mobile station contributes significantly to call quality in the mobile station.

If the number of bits within the first and second portions 802 and 804 of the channel information 801 are increased, then the transmission of the first and second portions 802 and 804 are no longer simultaneous but are in fact transmitted to the mobile station alternately in time. This amounts to a time-division multiplexing (TDM) of the first and second portions 802 and 804 as seen by the mobile station in this implementation. As different pilot channels transmitted via antennas 218 and are spread by different Walsh codes (see FIG. 4), the base-station is capable of controlling the mobile station to receive each of the first and second portions 802 and 804 in a TDM fashion in accordance with the invention.

In either implementation, the Walsh code assignment/controller block 809 controls the data splitter 803 to affect the subdivision of the channel information 801 in accordance with the invention. With input from the related functions block 407 of FIG. 4, the controller block 809 controls the number of bits which are subdivided and sent to antennas 218 and 222 based on such characteristics as channel conditions, transmission quality, signal-to-interference ratio, etc. In the preferred embodiment, the characteristic are determined and reported to the base-station receiver by the mobile station. This reporting by the mobile station is implemented in the scenarios where reciprocity does not apply. If reciprocity is assumed, the base-station receiver can determine the characteristics and input this information into the controller 809. As stated above, this information can then be used to vary the number of bits sent to the antennas 218 and 222 for transmission in accordance with the invention.

Other techniques to improve the transmission quality as seen by the mobile station can be beneficially implemented in accordance with the invention. For example, the total power allocated to a particular user can be split among the antennas 218 and 222. The simplest scheme directs equal amounts of power (e.g., one half the power for the two antenna case) to the different antennas 218 and 222. In another embodiment, the power is split unequally among the antennas 218 and 222, but the total power remains the same. In this embodiment, more power is allocated to the channel with the higher signal-to-noise ratio. For example, when the mobile station senses that one transmission via a particular antenna 218 or 222 has better quality than a transmission from the other, this characteristic is reported back to the base-station receiver and the power is adjusted accordingly in accordance with the invention. Classical information theory as described in "Digital Communications" by John G. Proakis, 3rd edition, 1995, McGraw-Hill, Newark, N.J. predicts that the information throughput is significantly improved in this embodiment.

Still one other embodiment provides unequal bit rate splitting. For example, rather than sending equal bit rates on each stream (as shown in FIG. 8), three-quarter (¾) of the channel information 801 can be subdivided into the first portion 802 while the remaining quarter (¼) is subdivided into the second portion 804. In this subdivision, the control of the subdivision would be responsive to an indication that a transmission via antenna 218 yields a better signal-to-noise ratio than a transmission via antenna 222. If one transmission via a particular antenna 218 or 222 is clearly superior to the transmission from the other, this characteristic is reported to the base-station and all of the channel information 801 can then be directed to the antenna providing superior transmission quality while the other antenna receives no information. In this scenario, one antenna is essentially disabled for a time until the transmission via the superior antenna begins to degrade. This embodiment also significantly improves the information throughput in accordance with the invention. To keep the output rate per antenna constant, the controller 809 changes the Walsh code rate accordingly as required. One skilled in the art will appreciate that various combinations of power allocation and bit rate splitting (either equal or unequal) can be utilized to improve overall system quality in accordance with the invention.

So that the mobile station accurately recombines the subdivided portions 802 and 804 and eventually properly decodes the channel information 801, the control information related to the subdivision (i.e., the number of bits or the ratio of bits sent to antennas 218 and 222, the Walsh code assignment, etc.) is communicated from the base-station to the mobile station in accordance with the invention. One technique to transmit control information to the mobile station is a "dim and burst" technique which is known in the art. In this technique, the rate at which traffic channel information is generated is reduced ("dimmed") within the processor 305 via signal 320 and the control information is placed into the newly available open segments ("burst") via the processor 305. The control information is provided to the processor 305 via signal 320. As such, both the traffic channel information and the control information are input into the encoder 304 and channel encoded together to produce the channel information 801. Alternatively, the control information can be transmitted to the mobile station via the slow associated control channel (SACCH) of the communication system which is also "multiplexed" with the traffic channel information as described above. Use of the SACCH to transfer control information to the mobile station is well known in the art.

It is well known that the fading processes, in time on the channels 330 and 332, must be sufficiently decorrelated to adequately provide the effects of diversity as seen by the mobile station. However, on real communications channels, this is difficult to achieve. To mitigate this problem, a further use of time diversity can be employed. In the preferred embodiment, block interleaver 308 provides some time diversity in the manner in which the matrix (as described above with reference to FIG. 3) is emptied "row by row". Since the transmitter of FIG. 8 provides at least two separate channels 330 and 332, further time diversity between the two channels 330 and 332 can be obtained. For example, if channel 330 was attenuated due to multi-path fading at a given instant and channel 332 was also attenuated due to fading at that exact same instant, information on both channels 330 and 332 would be lost on both channels simultaneously. This would reduce the diversity benefit.

To overcome this problem, time diversity could be further added to the transmitter of FIG. 8 in accordance with the invention if the time adjacent groups of bits output by encoder 304 were to pass over the orthogonal channels 330 and 332 at different times. To implement this time diversity in accordance with the invention, a signal 322 is coupled from the controller 809 to the interleaver 308 so that the interleaver 308 outputs information within the matrix at a time related to the subdivision of the channel information 801. For example, rather than emptying the matrix in the "row-by-row" manner as described above, the output of the channel information from the matrix is adjusted such that more time spacing occurs to adjacent, in time, channel information in accordance with the invention. Stated differently, the block interleaver 308 can be controlled based on the subdivision of channel information required. While a single block interleaver 308 is shown in FIG. 8 as the preferred embodiment, one skilled in the art will appreciate that the data splitter 803 could precede two separate block interleavers 308, all under control of the controller 809, to implement channel information subdivision in accordance with the invention without departing from the spirit or scope of the invention.

Figure 9:
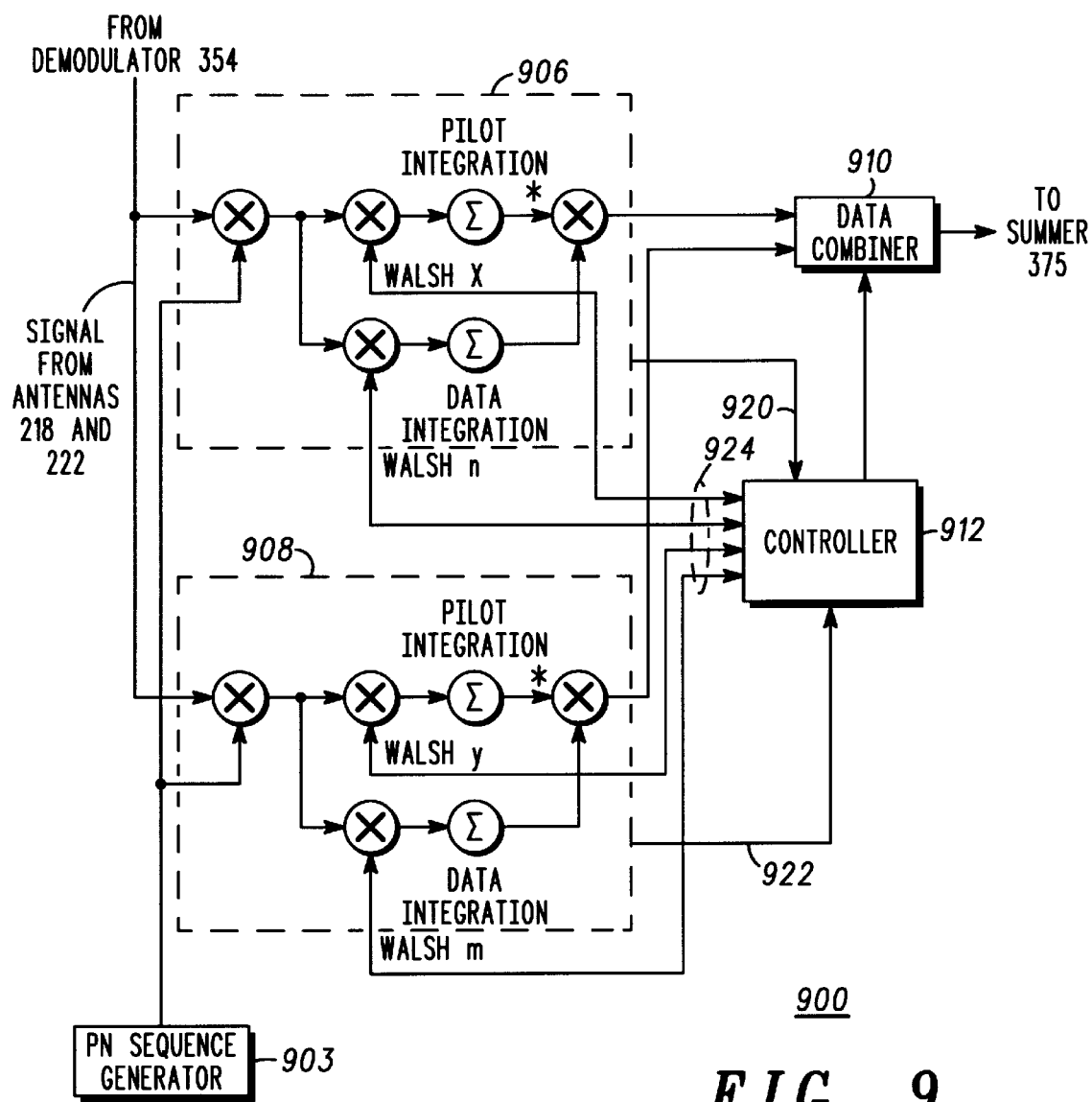
FIG. 9 generally depicts an alternate embodiment receiver for receiving transmissions from the transmitter of FIG. 8 in accordance with the invention.

FIG. 9 generally depicts a receiver for receiving transmissions from the transmitter of FIG. 8 in accordance with the invention. In the preferred embodiment, the receiver 900 depicts two RAKE receiver fingers 906 and 908 for processing the demodulated versions of the signals 330 and 332 transmitted from antennas 218 and 222 respectively. As shown in FIG. 9, the signals transmitted from antennas 218 and 222 are output from the demodulator 354 and are each input into the two RAKE receiver fingers 906 and 908 for processing. The two RAKE receiver fingers 906 and 908 are responsible for separating the signals 330 and 332 transmitted from antennas 218 and 222 for eventual combining by data combiner 910. Each demodulated version of the signals 330 and 332 transmitted from antennas 218 and 222 include a Pilot channel modulated with a different Walsh code per antenna which is used for detecting the corresponding bit stream transmitted on the particular antenna and related to the first portion 802 and the second portion 804.

In situations when the first and second portions 802 and 804 include one bit of the traffic channel information 801 at a time, the RAKE receiver fingers 906 and 908 process the signals transmitted from the antennas 218 and 222 essentially in parallel. The mobile station receiver receives the control information including this subdivision information and, via the controller 912 and control signals 920 and 922, reconstructs the signal for eventual decoding accordingly. For example, the control information including the subdivision information informs the controller 912 that the bit from the first portion 802 and spread with Walsh$_n$ needs to be combined, via data combiner 910, prior to the bit from the second portion 804 and spread with Walsh$_m$. The data combiner 910 essentially "undoes" the splitting which occurred in the data splitter 803 of FIG. 8, outputting a single signal to the summer 375. If the "dim and burst" or the SACCH technique for control information transfer as described above is implemented, normal decoding in the decoder 382 (beyond the summer 375) occurs as is well known in the art.

After reception and data combining in the data combiner 910, the signal output from the data combiner 910 is not (typically) an exact replica of the channel information 801, but is an approximation thereof based on the receivers ability to detect the demodulated versions of signals 330 and 332 transmitted by antennas 218 and 222 respectively. Inputs from other RAKE receiver fingers (not shown) are also input into summer 375, as is the output from the data combiner 910, for deinterleaving, etc. as described with reference to FIG. 4.

As is apparent from the receiver 900 structure of FIG. 9, the control information transferred to the receiver 900 is necessary for proper recombining and eventual decoding of the traffic channel information in accordance with the invention. When the first and second portions 802 and 804 each include a plurality of bits of the channel information 801, the data combiner 910 is again instructed, via control signals 920 and 222 and controller 912, to properly combine the plurality of bits from the first portion 802 (spread with Walsh$_n$) and the plurality of bits from the second portion 804 (spread with Walsh$_m$) to essentially reconstruct an approximate replica of the traffic channel information 801 for output to the summer 375. If an unequal splitting of bits is performed, the Walsh code lengths are adjusted accordingly via signals 924, again based on input from control signals 920 and 922 and controller 912, to maintain a constant rate at the output of data combiner 910.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A base-station in a communication system comprising:
   an interleaver outputting data that is to be transmitted to a single mobile station;
   a first spreader having a first portion of the data as an input and outputting the first portion spread with a first spreading code;
   a second spreader having a second portion of the data as an input and outputting the second portion spread with a second spreading code, wherein the first portion bypasses the second spreader and the second portion bypasses the first spreader;
   a third spreader having a pilot code as an input and outputting the pilot code spread with a third spreading code to produce a first pilot channel;
   a fourth spreader having the pilot code as an input and outputting the pilot code spread with a fourth spreading code to produce a second pilot channel;
   a first antenna having the first spread portion and the first pilot channel as an input; and
   a second antenna having the second spread portion and the second pilot channel as an input,
   wherein the first, second, third, and fourth spreading codes are orthogonal to one another.

2. The base station of claim 1, wherein the base station is arranged to:
   transmit the first pilot channel at a relatively high signal power level, such that the mobile station can use the first pilot channel as a primary pilot channel for acquisition and neighbor measurements, and
   transmit the second pilot channel at a much lower signal power level as a secondary pilot channel.

3. A method for transmitting a signal to a mobile station in a communication system, the method comprising the steps of:
   receiving an input signal that is to be transmitted to a single mobile station;
   dividing the input signal into a first and a second portion;
   spreading the first portion with a first spreading code to produce a first spread portion, wherein the second portion is not spread with the first spreading code;
   spreading the second portion with a second spreading code to produce a second spread portion, wherein the first portion is not spread with the second spreading code;
   spreading a pilot code with a third spreading code to produce a first pilot channel;
   spreading the pilot code with a fourth spreading code to produce a second pilot channel;
   transmitting the first pilot channel and the first spread portion via a first antenna to the mobile station; and
   transmitting the second pilot channel and the second spread portion via a second antenna to the mobile station,
   wherein the first, second, third, and fourth spreading codes are orthogonal to one another.

4. The method of claim 3 wherein the transmitting steps comprise the step of transmitting the first and the second spread portions to the mobile station alternately in time.

5. The method of claim 3 wherein the step of dividing the input signal into the first and the second portion comprises the step of dividing the input signal based on system characteristics.

6. The method of claim 3 wherein the step of dividing the input signal into the first and the second portion comprises the step of dividing the input signal based on a reception quality of the signal received by the mobile station.

7. The method of claim 3, wherein the transmitting steps comprise the steps of:
   transmitting the first pilot channel at a relatively high signal power level, such that the mobile station can use the first pilot channel as a primary pilot channel for acquisition and neighbor measurements, and
   transmitting the second pilot channel at a much lower signal power level as a secondary pilot channel.

8. A mobile station comprising:
   a receiver having a first spread portion and a first pilot channel as inputs and a second spread portion and a second pilot channel as inputs;
   a first despreader having the first spread portion as an input and outputting first despread data, wherein the first despread data is despread with a first spreading code;
   a second despreader having the second spread portion as an input and outputting second despread data, wherein the second despread data is despread with a second spreading code;
   a first pilot recovery circuit having the first pilot channel as an input and outputting a first despread pilot signal, wherein the first despread pilot signal is despread with a third spreading code;
   a second pilot recovery circuit having the second pilot channel as an input and outputting a second despread pilot signal, wherein the second despread pilot signal is despread with a fourth spreading code; and
   combination means having the first and the second despread data as an input and outputting combined data, wherein the combined data is a combination of the first and the second spread portions and comprises data transmitted to the mobile station by a base station,
   wherein the first, second, third, and fourth spreading codes are orthogonal to one another.

9. The mobile station of claim 8,
   wherein the first pilot channel is received at a relatively high signal power level, and the second pilot channel is received at a much lower signal power level, and
   wherein the mobile station is arranged to use the first pilot channel as a primary pilot channel for acquisition and neighbor measurements and to use the second pilot channel as a secondary pilot channel.

10. A method of receiving data transmitted to a mobile station, the method comprising the steps of:

receiving via an antenna, a first spread signal and a first pilot channel;

receiving via an antenna, a second spread signal and a second pilot channel;

despreading the first spread signal with a first spreading code to produce first despread data;

despreading the second spread signal with a second spreading code to produce second despread data;

despreading the first pilot channel with a third spreading code to produce a first despread pilot signal;

despreading the second pilot channel with a fourth spreading code to produce a second despread pilot signal; and combining the first and the second despread data, wherein the first, second, third, and fourth spreading codes are orthogonal to one another.

11. The method of claim 10, further comprising the steps of:

receiving the first pilot channel at a relatively high signal power level;

receiving the second pilot channel at a much lower signal power level;

using the first pilot channel as a primary pilot channel for acquisition and neighbor measurements; and using the second pilot channel as a secondary pilot channel.

* * * * *

UNITED STATES PATENT AND TRADEMARK OFFICE
CERTIFICATE OF CORRECTION

PATENT NO. : 6,173,005 B1  
DATED : January 9, 2001  
INVENTOR(S) : Kotzin et al.

Page 1 of 1

It is certified that error appears in the above-identified patent and that said Letters Patent is hereby corrected as shown below:

<u>Column 19,</u>  
Line 5, reads "an", should be -- the --.

Signed and Sealed this

Sixteenth Day of April, 2002

*Attest:*

JAMES E. ROGAN  
*Director of the United States Patent and Trademark Office*

*Attesting Officer*